United States Patent
Zierpka

(10) Patent No.: US 6,302,408 B1
(45) Date of Patent: Oct. 16, 2001

(54) TOOL SYSTEM THAT CAN BE COUPLED TO A LATHE DRIVE SHAFT

(76) Inventor: Eva-Maria Zierpka, Elfenweg 2, D-76199 Karlsruhe (DE)

( * ) Notice: Subject to any disclaimer, the term of this patent is extended or adjusted under 35 U.S.C. 154(b) by 0 days.

(21) Appl. No.: 09/423,533

(22) PCT Filed: May 6, 1998

(86) PCT No.: PCT/DE98/01265

§ 371 Date: Nov. 9, 1999

§ 102(e) Date: Nov. 9, 1999

(87) PCT Pub. No.: WO98/51450

PCT Pub. Date: Nov. 19, 1998

(30) Foreign Application Priority Data

May 10, 1997 (DE) .......................................... 297 08 384 U

(51) Int. Cl.[7] .......................... B23B 31/107; B23B 51/08; B23B 51/12

(52) U.S. Cl. ............................. 279/75; 279/14; 279/905; 279/140; 408/226; 408/140

(58) Field of Search .................................. 279/14, 75, 905, 279/140; 408/202, 224, 226, 140

(56) References Cited

U.S. PATENT DOCUMENTS

| | | | |
|---|---|---|---|
| 500,292 | * | 6/1893 | Nelson ................................. 408/140 |
| 1,346,341 | * | 7/1920 | Schinkez ............................... 279/75 |
| 2,393,424 | * | 1/1946 | Selch .................................... 408/226 |
| 2,915,925 | * | 12/1959 | Nipken ................................. 408/202 |
| 3,251,605 | * | 5/1966 | Ondeck ............................ 408/239 R |
| 5,013,194 | | 5/1991 | Wienhold . |
| 5,466,100 | * | 11/1995 | Ahluwalia ............................ 408/226 |
| 5,779,404 | * | 7/1998 | Jore .................................. 408/239 R |
| 5,975,815 | * | 11/1999 | Zierpka et al. ...................... 408/226 |

FOREIGN PATENT DOCUMENTS

| | | |
|---|---|---|
| 28 22 372 | 11/1979 | (DE) . |
| 0 685 300 | 12/1995 | (EP) . |
| 577300 | * 5/1946 | (GB) .................................... 408/202 |
| 4-365563 | * 12/1992 | (JP) . |
| 94/15755 | * 7/1994 | (WO) . |
| WO 94/15755 | 7/1997 | (WO) . |

* cited by examiner

Primary Examiner—Steven C. Bishop
(74) Attorney, Agent, or Firm—Collard & Roe, P.C.

(57) ABSTRACT

The invention relates to a tool system that can be coupled to the drive shaft of a lathe. Said system comprises a tool holding fixture which can be connected to the lathe, and a took which is stored in a polygonal recess in the tool holding fixture so as to be torsion-proof yet removable. This tool has a tool shank and at least one functional section extending coaxially therefrom. The tool rests axially on a centering area in the polygonal recess, and rests radially on several identical locking elements. These are arranged in radial cavities in the tool holding fixture, at equal angular distances and at an axial distance from the centering area. This enables centering of the tool in the tool holding fixture.

31 Claims, 4 Drawing Sheets

Figure 1:
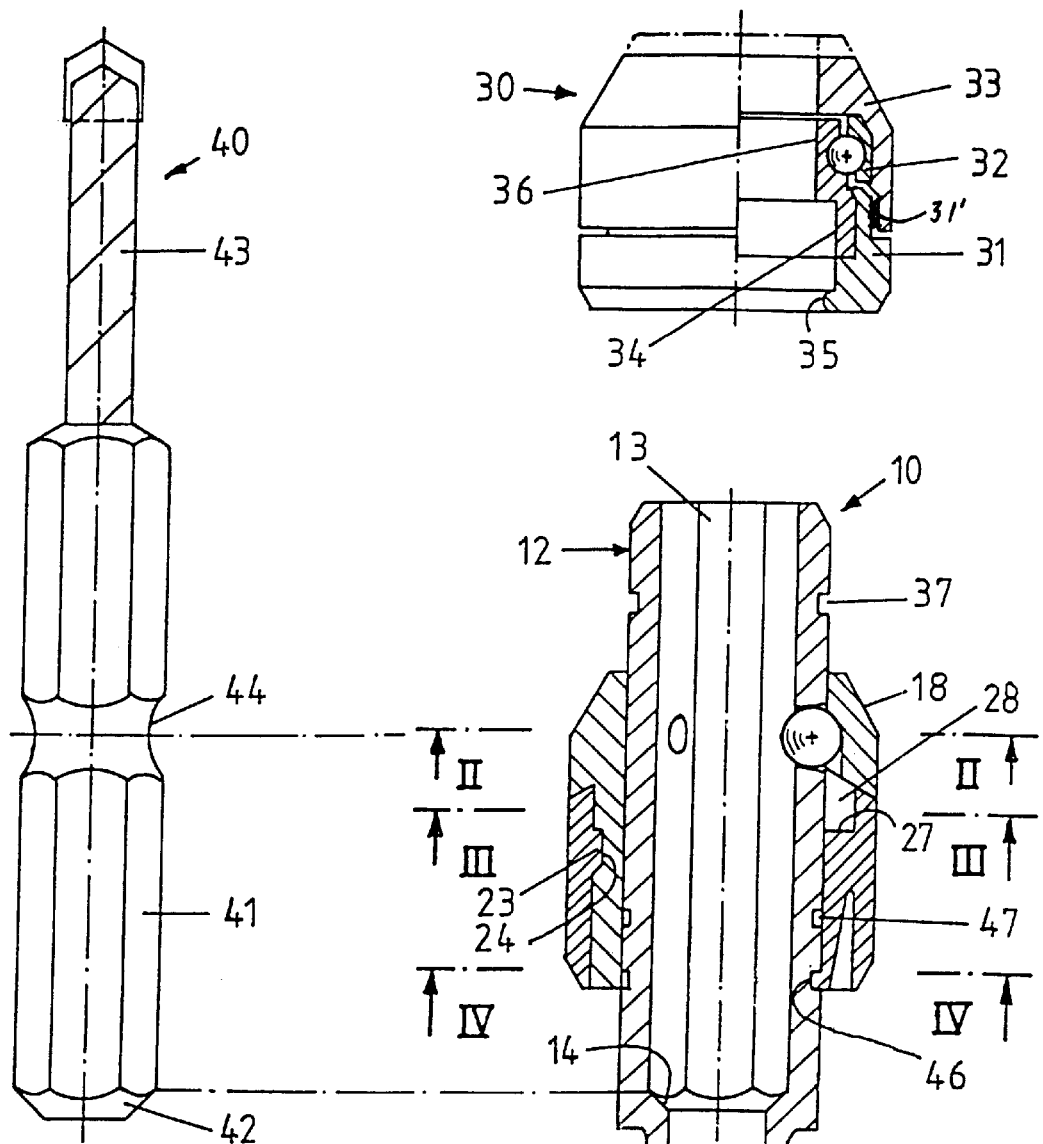

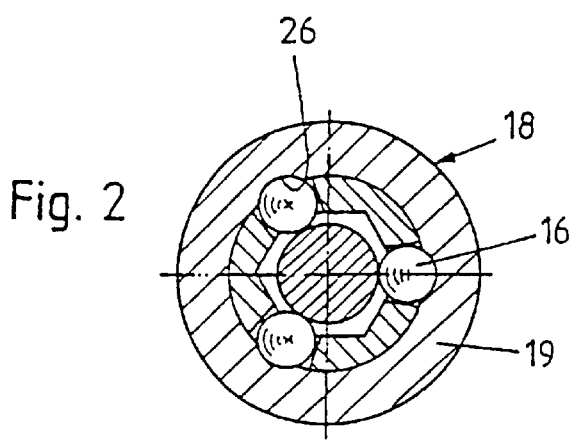
Fig. 2
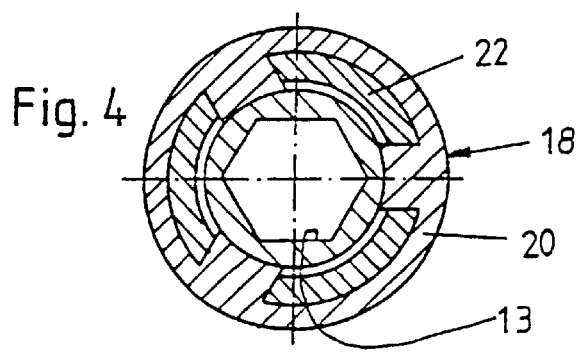
Fig. 3
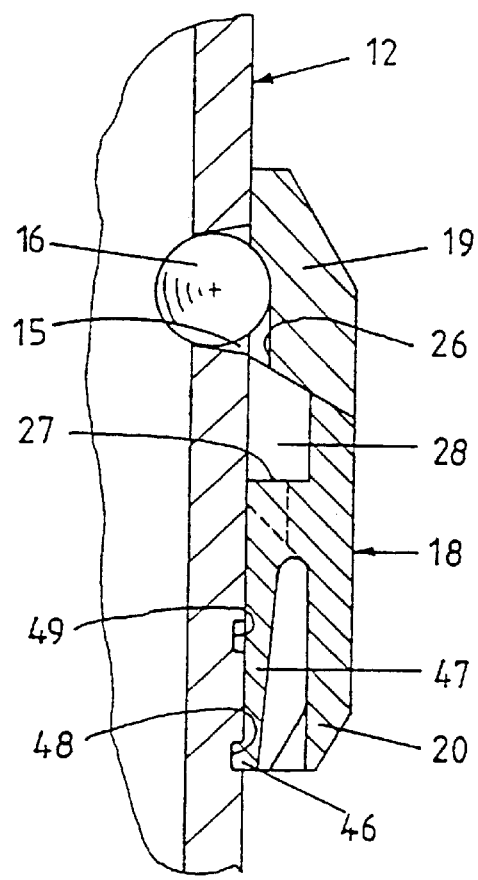
Fig. 5
Fig. 4

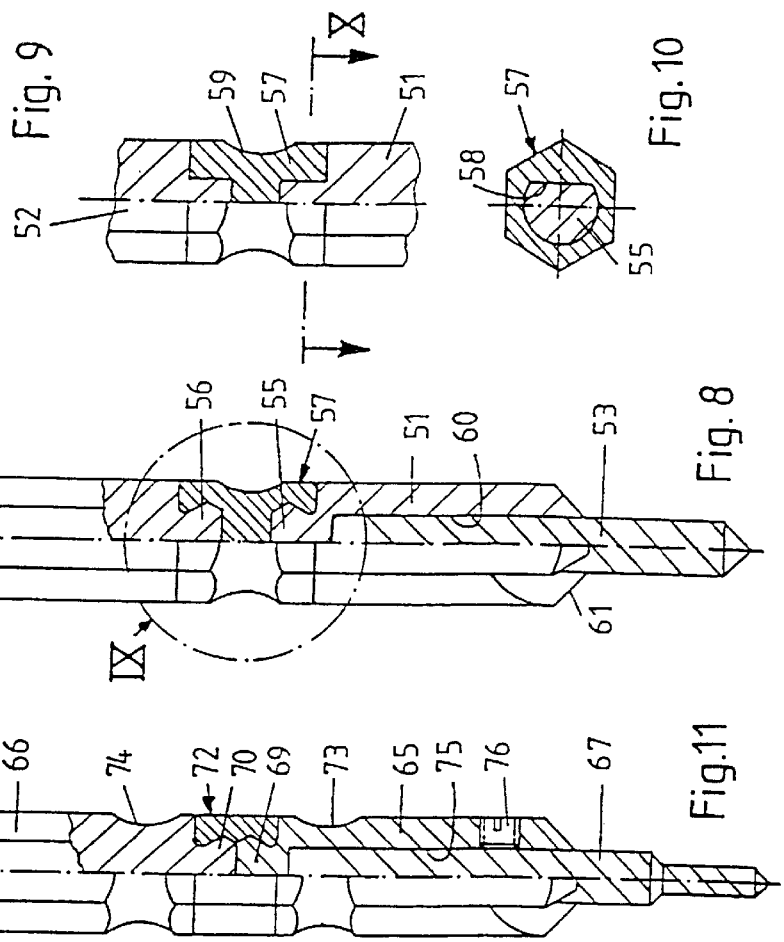
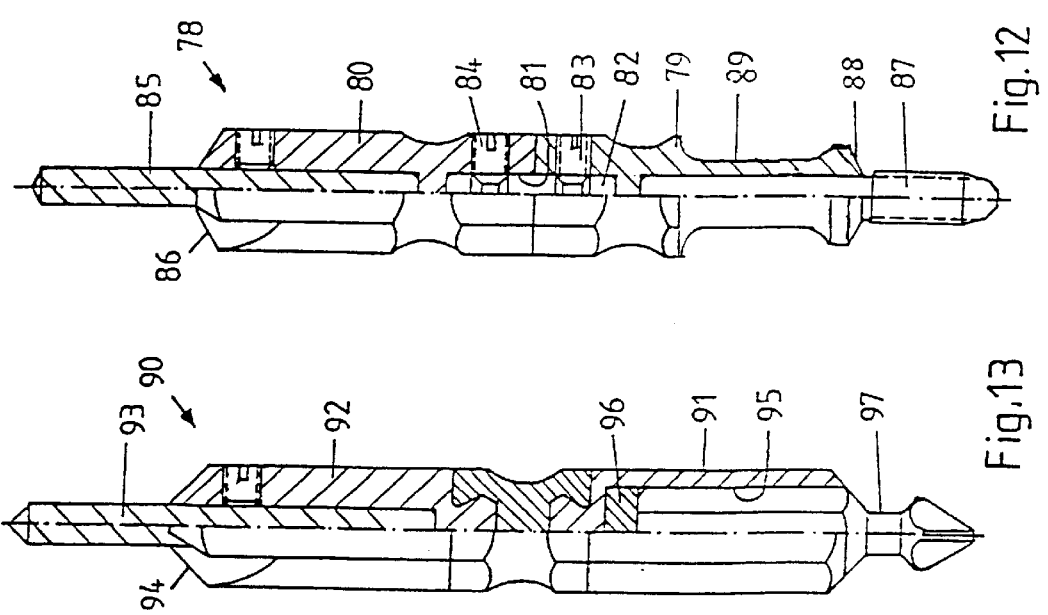

TOOL SYSTEM THAT CAN BE COUPLED TO A LATHE DRIVE SHAFT

The invention relates to tool system that can be coupled to the drive shaft of a rotary tool, such as a hand drill or a screw drill.

Such a tool system is known from JP-A-4365563. Therein is at hand essentially a so-called "bit holder". The actual tool of this systems are bits of varying sizes, whereby each individual tool at each front-face side has a bit section as functional section. Through this the tool is coupled to the drive machine that respectively one of the two bit points is clamped into a corresponding receiving device. This has the drawback that the bit itself is utilized for centering of the tool whereby the coupling in conformity with the size of the bit more or less is force-locking. This has the drawback that the functional sections during use relatively quickly wear in conformity with the quality of the coupling. Additionally, in the device of JP-A-4365563 there is contemplated an interlocking which, however, is acting only one-sided and, therefore, adds only in unsatisfactory manner to the centering of the tool. This also increases wear of the respectively clamped functional section.

From EP-O 685 300 A1 is already known a tool system which can be coupled to a hand drill or a screw drill, which comprises a tool holding fixture and a combination tool.

The combination tool has a shaft with hexagonal profile and two functional sections which extend coaxially therefrom and at opposite sides thereof. In use according to purpose the combination tool is received in a hexagonal recess of a sleeve-like adapter which is in conformity with the hexagonal profile of the tool shaft, which can be connected to the drive shaft of the rotary tool and by means of a detent device can be axially fixed. The adapter is connectable with the drive shaft of a rotary tool. As detent device serves a detent ball received in a radial recess which transgresses the cylinder mantle of the adapter. In a locking position the detent ball projects with a calotte into the recess of the adapter and extends into a surrounding radial groove in the shaft of a tool which is received in the adapter. The detent ball is held in the locking position by a calotte which is axially movable on the adapter forward into the recess of the adapter forward and extends into a surrounding radial groove in the shaft of a tool received in the adapter. The detent ball is held in the locking position by a locking sleeve which is axially movably received on the adapter, which due to the axial displacement can be moved into a position allowing the detent ball to be released to carry out radial avoidance.

It is of disadvantage in the prior known tool system that the detent ball which serves for the axial fixing must absorb the forces which arise during use in accordance with the purpose of the combination tool. Upon frequent use of the combination tool this leads to a rapid wear of the detent ball. Also not satisfactorily is the lagging in centering of the tool within the adapter.

From DE 28 22 372 A 1 is also known a tool system which comprises a tool holding fixture and a combination tool. The combination tool described comprises a shaft with a hexagonal profile which has two functional sections that coaxially extend. This combination tool is received in a hexagonal recess of an adapter which is adapted to the hexagonal profile of the tool shaft. In axial consideration the combination tool supports itself with a conical transition section, between tool shaft and functional section, at an equally conical ring shoulder of the adapter. So as to protect the combination tool from falling out, the radial recess of the adapter receives a detent ball which is radially movable in limited manner against the action of spring forces, which co-acts with the functional section arranged ring groove. During use of the combination tool, the axial forces are absorbed by the ring shoulder of the adapter and not, as is the case in the device according to EP-O 685 300 A 1, by the detent ball. However, also in EP-O 685 300 A 1 the centering of the combination tool in the adapter is not satisfactory.

Another tool system which is comprised of a tool holding fixture and a tool system which is comprised of a tool which is releasably received therein is described in U.S. Pat. No. 5,013,194. The tool holding fixture comprises a sleeve-like adapter furnished with hexagonal recesses which is connectable with the drive shaft of a rotary tool. Into the hexagonal recess can be slid a tool having a shaft with hexagonal profile as well as a functional section coaxially extending with this. For axial fixing of the tool into the shaft of the tool holding fixture an annular groove is provided and in the wall of the adapter are arranged at same angular distances several detent balls which project in a locking position with a calotte into the recess of the adapter and reach into the annular groove of the tool shaft. Simultaneously the tool supports itself at the face-side directed towards the rotary tool of the hexagonal recess directly at the adapter. EP 0 685 300 A 1 also consists of the detent ball that is held in the locking position by a locking sleeve which is axially movable received on the adapter, which can be moved through axial shifting into a position which allows the detent ball to move into a radial, avoidance releasing position.

Also, in this prior known device, the centering of the tool in the tool holding fixture is not satisfactory. Furthermore, the tool holding fixture does not allow the use of a combination tool.

In accordance with this the invention, is an improved tool system having a tool holding fixture and a receivable tool therein, in which the drawbacks of the prior known tool systems are avoided and in which particularly the centering of the tool is improved.

This aim is solved through a tool system with the features of claim 1.

In contrast with the prior art this tool system in accordance with the invention consists of a shaft, which is received in the polygonal recess of the reception cylinder of the tool, is supported at a centering range and thereby, on the one hand, is centered and, on the other hand, during use of the tool arising axial forces are absorbed. The detent recess of the tool shaft contains detent elements that are uniformly distributed about the circumference and co-act with the centering range of the polygonal recess which in comparison with the state of the art substantially improves the centering of the tool in the tool holding fixture. The radial forces arising in the detent element are low when the tool is used in accordance with its purpose, since they have to absorb such axial forces which arise on retracting of the tool from its operative position The centering range of the tool holding fixture may preferably be accomplished with a conical support shoulder which is coaxially arranged with the drive shaft directing end of the polygonal recess of the reception cylinder, whereby the shaft of the tool at its end remote from the functional section has a centering cone which corresponds to the conical support shoulder. An appreciably improved centering of the tool system is obtained through co-acting of the support shoulder and the centering cone.

In another embodiment of the invention, the locking sleeve is axially configured on the reception cylinder of the tool holding fixture and comprises a movable sliding sleeve and a locking section which serves to hold the detent elements in their detent position, and one to this connected retention section, which retention section exhibits means for positioning of the locking sleeve in the locked and unlocked position. This two part configuration of the sliding sleeve is particularly of advantage under considerations of production-technology.

In the case of utilization of ball-shaped detent elements it has been shown as being useful when the locking section of the locking sleeve has a support surface which is adapted to the contour of the detent balls and can support the detent balls in the detent position in surface-contact manner. Thereby, due to appearance of axial forces during retraction of the tool from its position of use, low surface-area pressures are ensured between the detent balls and the mentioned support surface of the locking section As means for arresting positioning of the locking sleeve its retention section can, usefully, be equipped with a detent element and the cylinder mantle of the reception cylinder can have at least one detent recess into which, as a function of the prevailing position of the locking sleeve, the detent element releasably extends.

Instead of only one detent recess naturally in the cylinder mantle of the reception cylinder which receives the locking sleeve can also be equipped with two detent recesses for selectively positioning of the locking sleeve, which are axially separated at such a distance that in the case of co-acting of the detent element with the one detent recess, the detent elements in their detent position are held, and in the case of co-acting of the detent element with the other detent recess, the detent elements for radial avoidance are released into their unlocked position.

The locking section and the retention section of the locking sleeve can basically be connected in any manner with one another. An especially simple and cost-efficient embodiment is a force-locking connection, like through a clip-connection. The locking section of the locking sleeve is comprised of a material of high hardness, like steel, while the configuration of the locking section having been made of a somewhat elastic properties exhibiting synthetic-plastic has been shown to be useful.

The tool holding fixture can be connected fixedly or releasably to the drive shaft of a rotary tool. It has been found useful, however, to choose a releasable connection, like by means of a coaxially from the reception cylinder further extending clamping plug and received in the clamping jaws arranged at the drive shaft of the rotary tool.

Within the frame work of the invention there can also be provided a depth abutment which can be releasably mounted on the tool holding fixture which is adapted to be received coaxially in the rearward section on the reception cylinder of the tool holding fixture, and comprises a forward section which is rotatably journalled at the rearward section.

When using such a depth abutment it is, for one, given a precise depth arranging for the respective tool, and, on the other hand, it is also ensured that on reaching the predetermined depth the forward section is positioned atop the work piece and, in consideration of its rotatably journaling at the rearward section does not participate at its rotation, so that no scratches can arise at the work piece.

In such depth abutment it has also shown advantageous when the forward section is releasably connected to the rearward section, like through a clip connection. Through this selectively forward sections with different extents in length can easily be coupled to the rearward section of the depth abutment and thereby in most simple manner different depths can be used.

The depth abutment per se, can by use of a lock means which extends into a corresponding detent recess of the reception cylinder, be releasably connected with the reception cylinder such that a simple and rapid assembly and disassembly of the depth abutment is assured. The depth abutment can, however, be longitudinally adjustably configured, by means of a threaded section between the forward and the rearward section, so as to allow an adaptation to the respectively required working depth.

Instead of a tool with a functional section extending coaxially at one end from the tool shaft, there also a combination tool that can be provided at which at both ends of the tool shaft are arranged co-axially to this further extending functional sections.

Such a combination tool has two longitudinal axes which each comprises a shaft section with a polygonal recess of the reception cylinder adapted polygonal profile and of a functional section, part-tools, the shaft sections of which are connected to one another.

For this purpose, in another embodiment, the ends of the shaft that face each other are furnished with connection sections, which have undercuts for force-locking engagement of coupling means. As coupling means can be usefully provided a connection part axially with respect to one another facing coupling recesses for shape-locking insertion into the undercuts at the ends of the shaft sections.

A further embodiment provides that the connection sections of the part-tools are for axial force absorption at their face-side positioned towards one another and are in contact with one another, and that a connection piece is provided a coupling ring which has round bulges for engaging in the undercuts, made of a solid, however, in limited manner elastic material, like plastic-synthetic material.

A further embodiment of the combination tool, in the interest of a rotation-fast connection between the part-tools, provides that the undercuts of the connection sections are constructed to be non-radially-symmetric and co-act with a correspondingly shaped connection part in shape-locking manner such that the shaft sections of the part-tools are rotation-fast connected to one another and with the edges of their polygonal profiles are with respect to one another in an aligned manner fixed in position. The undercuts can have a cross-section in the shape of a circle-segment and the connection part is then furnished with corresponding circle-segment-shaped coupling recesses.

Within the frame work of the invention, the connection of the part-tools can also be done in such a way that the ends of the shaft sections which are directed towards one another are respectively furnished with a central bore and in these bores is received a connection pin as well as through holding screws is fixed, which, in turn, are received in transversely to the central bores of the part-tools extending threaded holes.

A further important embodiment of the tool provides that the respective functional section or at least one of the part-tools is releasably connected with the shaft or, respectively, with the shaft section of the part-tool. For this the functional section is received in an axially shiftable manner in a bore of the shaft or, respectively, of the shaft section, however, is fixable in a predetermined axial position by means of a screwed-in arresting screw, secured radially into the wall of the shaft or, respectively, the shaft section transgressing threaded bore.

Another embodiment of the invention is where a step borer is the functional section and is provided with two different drill cross-sections. Such a step drill has been proven advantageous for connection of two construction parts, for example, it requires a through-bore in the one construction part and one with this through-bore aligned pre-bore for turning-in of a connection screw in the other construction part.

The tool configuration can, however, also be such that the shaft of the tool or, respectively, the shaft section of the part-tool has a central polygonal recess, preferably a 1/40 hexagonal recess, for reception of a corresponding functional bit, like a screw drill bit. Such a screw drill bit can be held, for example, by means of a holding magnet received in the polygonal recess of the shaft, axial-fast, but releasably.

Finally, a further embodiment also provides that a part-tool of the combination tool at its shaft-part end which is remote from the other part-tool, is provided with a sink section and an axially projecting drill beyond this functional section. In such a tool configuration it is achieved in simple manner in succession to the drilling step to carry out a sinking of the bore hole, for example, for the receipt of a screw head. In this case, the sink section is a 90°-sink.

Within the scope of the invention the sink section can be laid-out for beveling of drill holes for subsequent provision of a threaded hole and that the part-tool which is remote from the sink section is equipped with a tap drill which is adapted to the drill cross-section of the drill. With such tool configuration success is had with the forming of the bore hole for the subsequent cutting of threading and the beveling of the bore hole in immediately successive steps, the forming of a threaded hole after re-tooling of the tool in the tool holding fixture such that the tap drill projects beyond the tool holding fixture.

In a further advantageous embodiment of the tool system, in accordance with this invention, a torsion zone and/or bending zone is provided in the reception cylinder of the tool holding fixture, between the detent receiving elements provided radial recesses and the centering range of the polygonal recess.

So as to improve the operation of the tool system, in accordance with the invention, the reception cylinder is secured at the tool holding fixture via a safety coupling, preferably, a slip clutch.

Figure 14:
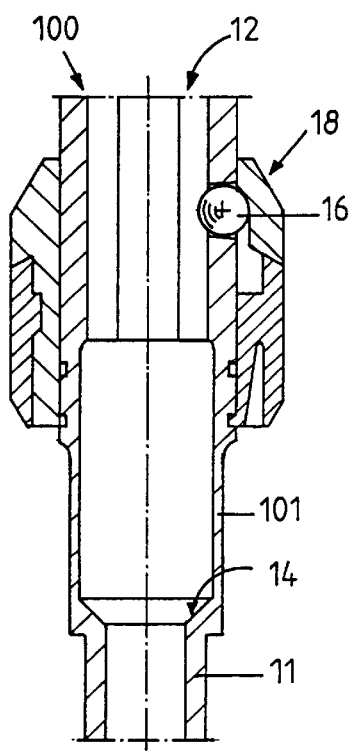
Figure 15:
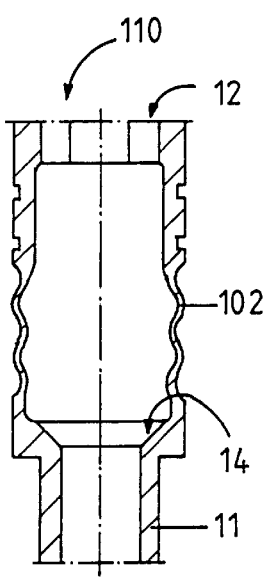

The enclosed drawings that follow show the embodiments of a tool holding fixture and a depth abutment as well as several tool configurations in accordance with the invention are to be further explained. In schematic views show:

FIG. 1 a sleeve-like tool holding fixture with an on this arranged locking sleeve in a longitudinal sectional view, FIG. 2 a cross-section of the tool holding fixture along section line II—II in FIG. 1, FIG. 3 a cross-section through the tool holding fixture in accordance with section line III—III in FIG. 1, FIG. 4 also a cross-section through the tool holding fixture along section line IV—IV in FIG. 1, FIG. 5 an enlarged portion of FIG. 1 details of the axially movable guided locking sleeve on the reception cylinder of the tool holding fixture for selectively arresting or release of detent balls, FIG. 6 a depth abutment which can be coupled to the tool holding fixture in part in side view and in part in a longitudinal sectional view, FIG. 7 a drill tool which can be coupled to the tool holding fixture, FIG. 8 a combination tool shown in part in cross-section, comprised of to part-tools connected to one another, FIG. 9 a half-sectioned of the rotation-fast connection of two part-tools as combination tool, FIG. 10 the rotation-fast connection of two part-tools in a cross-section in conformity with section line X—X in FIG. 9, FIG. 11 in a view as in FIG. 8 another combination tool with at front-face abutting part-tools, FIGS. 12, 13 further combination tools in views as in FIG. 11, FIG. 14 in a section-manner sectional view of a tool holding fixture the reception cylinder of which is furnished with a polygonal recess for receiving a tool, with a torsion zone, FIG. 15 in a view as in FIG. 14 a tool holding fixture, the reception cylinder of which has a torsion/bending zone and FIG. 16 again in a view as in FIG. 14 of a tool holding fixture, the reception cylinder of which is furnished with a polygonal recess for securing of a tool and is secured via a slip clutch.

FIG. 1 shows an embodiment of the tool holding fixture 10 and the sleeve-like adapter with a clamping plug 11 which can be received in a clamping jaws assembly, like of a hand drill (not shown), rotation-fast and thereby is capable of being coupled to its drive shaft and coaxially attached to the clamping plug 11 arranged reception cylinder 12. From the side of the reception cylinder 12 which is remote from the clamping plug 11, extends into this a hexagonal recess 13 which to the clamping plug 11, which is pipe-like formed and exhibits smaller diameter than the reception cylinder 12, is terminating in a conical support shoulder 14.

The mantle of the reception cylinder 12 is in distant manner from the support shoulder 14 transgressed by three radial recesses 15 which are evenly distributed about the circumference of the reception cylinder and into which respectively one detent ball 16 is received. The radial recesses 15 are becoming more slender from the outside to the inside in such a way that the detent balls 16 in the radial recesses 15 are held, however, in their end positions project with ball calottes into the hexagonal recess.

On the reception cylinder 12 of the tool holding fixture 10 is an axially movable guided locking sleeve 18 which, as is depicted in FIG. 2, in a locking position arrests the detent balls 16 into their hexagonal recess 13 projecting position, and in an unlocking position releases, for radial avoidance, as is depicted in FIG. 3. The locking sleeve 18 is comprised of an annular locking section 19 and a therewith form locking, fixedly connected retention section 20. In some cases the retention section is made of an elastic plastic-synthetic injection-cast part. The locking section 19 can be configured as metallic, alternatively, however, it is also possible to make the locking section 19 of plastic-synthetic so as to utilize the elastic behavior of the material of construction for a nearly fully tolerance-free tool centering. Upon the introduction of the detent balls 16 into the radial recesses 15, the retention section 20 is slid, from the side facing the clamping plug 11, onto the locking section 19 and extends over from this radially projecting cylinder segments 22.

An annular groove 23 extends into these cylinder segments, into which form-lockingly extends an adapted annular band 24, which projects interiorly radially from the retention section 20 and is snapped in after the sliding of the retention section 20 in the direction to the clamping plug 11 projecting cylinder segments 22 of the locking section 19.

In the area of the in the radial recesses 15 received detent balls 16 on the inner side in the locking section 19 of the locking sleeve 18 are cut-in longitudinal grooves 26 which exhibit a cross-section with a radius which is equal to the radius of the detent balls 16 and, on the side which is remote from the retention section 20, terminate in such same bent formations, as is depicted in FIG. 5. In the locking position shown in FIG. 1 of the locking sleeve 18 the detent balls 16 are in their detent position by projecting into the hexagonal recess 13 of the reception cylinder 12 and are supporting themselves on the outer side at the longitudinal grooves 26 in surface-area manner. Aligned with the longitudinal grooves 26 there extend in the locking sleeve 18 from a shoulder 27 axially limited recesses 28, as free-spaces for the receipt of the detent balls 16 in their unlocking positions.

To the tool holding fixture 10 in selective manner can be coupled a depth abutment 30. The depth abutment is comprised of a side which is remote from the clamping plug 11, on the reception cylinder 12 receivable rearward section 31, to which is connected via a ball bearing 32 a forward section 33. The rearward section 31 of the depth abutment 30 is formed by a plastic-synthetic ring with a central recess 34 which is adapted to the outer diameter of the reception cylinder 12, into which projects a ring bulge 35 which projects at the end remote from the ball bearing 32. An inner ring 36 of the ball bearing 32 is received by the plastic-synthetic ring formed rearward section 31 which projects radially into the central recess and thereby forms an axial limit to the reception cylinder 12 adapted central recess 34. By the forward section 33 of the depth abutment 30 is also made of a plastic-synthetic injection-cast past which extends about an outer ring of the ball bearing and under a certain spring pre-tension is received on this in a replaceable manner. Thereby succeeds the equipping of the depth abutment 30 with forward sections of different lengths. There is also a threaded section 31' that is disposed between rearward section 31 and forward section 33. Threaded section 31' allows depth abutment 30 to be longitudinally adjusted.

During use, in accordance with this invention, the rearward section 31 of the depth abutment 30 is received on that end of the reception cylinder 12 which is remote from the clamping plug 11, whereby the central recess 34 projecting edge bulge 35 engages into an exteriorly annular groove 37 cut into the reception cylinder 12.

When in the polygonal recess 13 of the reception cylinder 12 a tool is received and by means of the detent balls 16 axial-fast is held, the functional section, for example, a drill, projects from the remote side of the clamping plug 11 from the reception cylinder 12 and the on this received depth abutment 30. When with such a drill a bore is made, whereby in consideration of the force-locking reception of the rearward section 31 of the depth abutment 30 on the reception cylinder 12, the depth abutment also co-rotates, upon reaching of a certain drill depth the forward section 33 of the depth abutment 30 with its front face which is remote from the ball bearing 32 is supported on the work piece and does not participate in any further rotation of the tool holding fixture 10 and therewith the work piece, due to its via the ball bearing 32 imparted rotatable connection with the rearward section 31. This avoids scratches on the work piece. In consideration of the replace-ability of the forward section 33 of the depth abutment 30 against forward section with other lengths, the depth abutment 30 can be utilized for limiting different bore depths.

There can be coupled with the tool holding fixture 10 a tool 40 as is depicted in FIG. 7, in rotation-fast manner. The tool 40 has a shaft 41 with a hexagonal profile which is adapted to the hexagonal recess 13 extending into the reception cylinder 12. The shaft 41 is concluded at a face end a to the conical support shoulder 14 of the reception sleeve 12 adapted centering cone 42 and from the other end of the tool shaft 41 extends from drill 43. In the tool shaft 41 is arranged at a distance from the centering cone 32 which is equal to the axial distance between the hexagonal recess 13 of the reception cylinder 12 limiting support shoulder 14 and the detent balls 16 a surrounding annular groove 44 as detent recess, which is adapted to the contour of the detent balls 16 and into which in the locking position of the locking sleeve 18 the detent balls 16 form-lockingly engage and thereby in the range of the longitudinal grooves 26 in the locking section 19 of the locking sleeve 18 support themselves. In this position the locking sleeve is arrested by a detent element 46 which is arranged at spring, arm 47 extending from the retention section 20 of the locking sleeve 18 between the cylinder segments of the locking section 19 and form-lockingly engages into a surrounding annular groove 48 of the reception cylinder 12.

When the locking sleeve 18 is actuated from this locking position into a unlocking position towards the side remote from the clamping plug 11, the detent element 46 engages into a corresponding distance from the first annular groove 48 into the reception sleeve 12, cut second annular groove 49. In this position of the locking sleeve 18 longitudinal grooves 26 are axially cut into the locking section 19 these arranged recesses 25 stand over the radial recesses 15 received detent balls 16 in them such that the latter can evade in such a manner into the recesses 28 that no ball calottes project into the hexagonal recess 13 of the reception cylinder 12.

In this unlocking position the shaft of a corresponding tool can be introduced into the hexagonal recess and also be removed from this.

FIG. 8 is in contrast with this depicted combination tool 50 that comprises a two part-tool with face-ends connected to one another, with respectively one shaft section 51, 52 with hexagonal recess 13 of the reception cylinder 12 adapted hexagonal profile, and one from the respective shaft section projecting functional section 53, 54. At the ends of the shaft that face one another sections 51, 52 project from this mushroom-shaped coupling elements 55, 56 with undercuts. Between the shaft sections 51, 52 is arranged a connection part 57 made of limited elastic material, for example, a suitable plastic-synthetic, which in face-side ending coupling recesses receives the coupling sections 55, 56 of the shaft sections 51, 52, and extends behind their undercuts. Respectively the projecting coupling plugs 55, 56 of the shaft sections and the coupling recesses of the connection part are furnished with a flat portion 58 which provides a rotation-fast connection to the shaft sections 51, 52 with one another. Furthermore, the connection part in congruency with the shaft sections 51, 52 are furnished with a hexagonal profile and in the connection part extends in a surrounding manner an annular groove 59, as a detent recess, into which reach in accordance with the purpose of use of the combination tool 50 the detent balls 16 of the tool holding fixture 10.

In the case of the functional section of the one part-tool, a drill which is rotation-fast is received in an axial bore 60 of the shaft section 51. On the side directed to the drill is immediately formed to the shaft section 51 a sink section 61. The other shaft section 52 is formed with a directly formed cross-slot screw tool.

Also FIG. 11 depicts a combination tool 64 that is comprised of two part-tools with respectively one shaft section 65, 66 and from this projecting functional section 67, 68. At the functional sections remote ends, from the shaft sections project coupling sections 69, 70 with undercuts, but the coupling sections of the two shaft sections 65, 66 are positioned in facing manner in contact with at one another, which is in contrast to the embodiment in accordance with FIG. 8. The two shaft sections are held together by means of an annular connection piece 72 which surrounds the coupling plugs 69, 70 and extends behind their undercuts.

Furthermore, in contrast to the embodiment in accordance with FIG. 8, respectively, distanced from the connection piece, the shaft sections 65, 66 are furnished with surrounding grooves 73, 74 as, for use in accordance with the purpose, with detent balls 16 of the tool holding fixture 10 co-acting with the detent recesses.

By the functional section 67 of the one part-tool there is a step drill which is received in a longitudinal bore 75 of the shaft section 65 in a length-adjustable manner and is fixed by means of a small screw 76, which is received transversely to the longitudinal bore 75 extending threaded bore.

FIG. 12 depicts a functional tool 78 which there extends respectively from the end of the shaft sections 79, 80 that face one another into this a central bore 81 in which is received a plug 82 which connects the two shaft sections 79, 80. Fixed on the plug 82 are the two shaft sections 79, 80 by means of respective small screws 83, 84 which are received in a threaded bore extending transversely to the longitudinal axis of the shaft.

The one shaft section 80 of the embodiment, in accordance with FIG. 12, is equipped with an axial bore adjustable by means of a screw secured drill 85 that enters a transversely extending threaded bore, and the shaft section end is formed as 120° sink section 86. The other shaft section is equipped with a tap drill 87 as the functional section, the other end of the bore section is received in the longitudinal bore of the respective shaft section 79. The shaft section 79 has at the end directed towards the tap drill 87 a shoulder 88 by means of which the tool 78 in the mounted condition can axially support itself on the support shoulder 14 of the tool holding fixture 10. At the same time, this shoulder 88 serves to provide as depth abutment so as to avoid the tap drill being supported at the tip during the production of threaded sack-holes. Furthermore, the shaft section 79 is provided with a torsion zone 89.

The combination tool 90 depicted in FIG. 13, describes a functional tool in the same manner as the above and in combination with FIG. 8. Combined shaft sections 91, 92 is equipped with a drill 93 received in a longitudinal bore by means of a small screw secured drill 93, and the drill directed end being equipped with a 90° sink section 94. The other shaft section 91 is equipped with a 1/40 hexagonal recess 95 and receives a rotation-fast shaft of a screw drill bit. At the bottom of the hexagonal recess 94 is a holding magnet 96 that holds the screw drill bit 97 sufficiently axial-fast.

FIG. 14 shows a tool holding fixture 100 that is different from the tool holding fixture 10 whereby the wall of the reception cylinder 12 is in a limited range, between the support shoulder 14 and the detent balls 16, and is of considerably reduced thickness and thereby forms a torsion zone 101. However, instead of a torsion zone 101, as shown in FIG. 15, a torsion and/or bending zone 102 can be provided in the reception cylinder 12 between the conical annular shoulder 14 and the detent elements. This torsion and/or bending zone can either be comprised of a wave-like hose part of the wall of the reception cylinder 12, or of an elastic material section of cylinder 12. The torsion and/or bending zone 102 also allows, to a limited extent, the actuation of the tool through an angle, inclined with respect to the axis of rotation of the drive shaft of a rotary tool.

Figure 16:
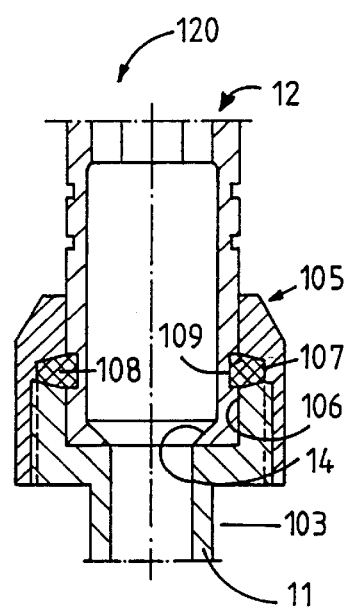

So as to protect the tool system, in accordance with the invention, by limiting the torque which can be imparted against overloading, and to prevent damage to the tools and work pieces, FIG. 16 depicts a tool holding fixture 120 that provides a reception cylinder 12 which contains a slip clutch 105 with the clamping plug-side portion 103. As opposed to the foregoing described tool holding fixtures 10, 100, 110 serving as a single unit providing element, together with the clamping plug 11 with directed section 103 of the tool holding fixture.

For this purpose the portion 103 of the tool holding fixture at the remote end from clamping plug 11 has a cylindrical recess 106, with its inner diameter adapted to the outer diameter of the reception cylinder 12. In the recess 106 is arranged an annular groove 107 which is for the purpose of receiving a friction ring 108. In front of annular groove 107 is a friction ring 108 interiorly projecting into recess 106, and extends into a radial groove 109 extending at reception cylinder 12. Thus, there is provided not only a reliable friction-lock connection between the clamping plug-side portion 103 of tool holding fixture 120 and reception cylinder 12, but, additionally, reception cylinder 12 is axially fixed at portion 103.

What is claimed is:

1. A tool system that can be coupled to a drive shaft of a rotary tool, such as a hand drill or a screw drill comprising:
   a) a tool holding fixture coupled to the drive shaft of the rotary tool said tool holding fixture having a reception cylinder which contains a polygonal recess and wherein said reception cylinder contains a centering range;
   b) a tool disposed in said polygonal recess of said reception cylinder, said tool being fixed to said reception cylinder rotation fast, wherein said tool has a polygonal shaft adapted to fit into said polygonal recess, wherein said tool has at least one functional section, and at least one centering section having at least one annular groove wherein when said tool is in operation, said centering section fits into, and contacts said centering range on said tool holding fixture,
   c) a locking sleeve disposed around said tool holding fixture, and axially movable around said tool holding fixture; and
   d) at least one detent element, disposed within said tool holding fixture, and for engaging said at least one detent recess of said tool shaft, wherein said locking sleeve can be moved along said tool holding fixture to alternately move said at least one detent element into a locked position with said detent recess or an unlocked position removed from said detent recess so that said tool can be either locked into, or unlocked from said tool holding fixture.

2. The tool system according to claim 1, wherein said centering range is shaped frusto-conically and coaxially arranged with said polygonal recess of said reception cylinder, and wherein said shaft of said tool has a centering section which is shaped to mate with said frusto-conically shaped centering range.

3. The tool system according to claim 1, wherein said locking sleeve further comprises:
   a locking section which holds said at least one detent element in their locked position; and
   a retention section which can position the locking sleeve in the locked and unlocked position.

4. The tool system as in claim 3, wherein said at least one detent element is in the form of a detent ball, and wherein said locking section of said locking sleeve has a contour of detent balls adapted to support a recessed surface in said reception cylinder so that said at least one detent element can support themselves in the detent position in a surface-contact manner.

5. The tool system according to claim 4, wherein said retention section of said locking sleeve has at least one detent element and said reception cylinder has at least one reception device into which said at least one detent element releasably extends for positioning said locking sleeve.

6. The tool according to claim 5, wherein said reception cylinder has a cylinder mantle having a first and a second reception device for selectively positioning said locking sleeve wherein said reception devices are axially separated at such a distance so that when said detent element is held in said first reception device said locking sleeve is held in a locked position, and when said detent element is held in said second reception device said locking sleeve is held in an unlocked position.

7. The tool system according to claim 6, wherein said locking section and said retention section of said locking sleeve are connected to each other in a force-locking manner, through a clip-connection.

8. The tool system as in claim 4, wherein said locking section of said locking sleeve is made from steel.

9. The tool system according to claim 7, wherein said tool holding fixture is releasably disposed, in said clamping plug by means of said clamping jaws.

10. The tool system according to claim 1, further comprising a depth abutment which can be releasably mounted on said tool holding fixture, said depth abutment having a rearward section on said reception cylinder, and a forward section which is rotatably journalled at said rearward section.

11. The tool system according to claim 10, wherein said forward section of said depth abutment is releasably connected, by a said at least one detent element or a clip connection with said rearward section.

12. The tool system according to claim 10, wherein said depth abutment is longitudinally adjustably configured, by means of a threaded section disposed between said forward section and said rearward section.

13. The tool system according to claim 1, wherein said tool is formed as a combination tool, wherein said combination tool shaft is disposed coaxially from said extending functional sections.

14. The tool as in claim 13, wherein said combination tool is comprised of two sections extending along a longitudinal axis of said tool, with said two sections comprising a shaft section, shaped to fit into said polygonal recess of said reception cylinder and a functional section coupled to said shaft section.

15. The tool system according to claim 14, wherein said shaft section have a connection sections having undercuts.

16. The tool system according to claim 15, further comprising a connector for coupling two of said combination tools together at an end of said shaft sections with said connector connecting into said connection sections.

17. The tool system according to claim 13, wherein said functional section is releasably connected with said shaft section of said combination tool.

18. The tool system according to claim 17, wherein said shaft sections have a bore extending longitudinally therein wherein said functional section is axially shiftable in said bore, and wherein said shaft section has a threaded bore extending substantially perpendicular to said longitudinal bore, and said system further comprises at least one arresting screw, for screwing into said threaded bore and for axially fixing said functional section in said longitudinal bore.

19. The tool system according to claim 1, wherein said functional section comprises a step borer having at least two different drill cross sections.

20. The tool system according to claim 19, wherein said shaft section of said combination tool has a central polygonal recess, shaped as a ¼ hexagonal recess, for receiving a screw drill bit.

21. The tool system as in claim 20, wherein said functional bit is held axially fast by a magnet but is releasably received in the polygonal recess of the shaft.

22. The tool system as in claim 14, wherein said functional sections on said shaft part end comprise a sink section and an axially projecting drill.

23. The tool system as in claim 22, wherein said sink section comprises bevels for drill holes for containing a threaded hole, wherein the other part-tool has a tap drill which is adapted to the drill a cross-section of the drill.

24. The tool system as in claim 1, further comprising a safety coupling, for coupling said reception cylinder to said tool holding fixture.

25. The tool system as in claim 24, wherein said safety coupling is a slip clutch.

26. The tool system according to claim 15, wherein said shaft section which is directed towards one another, have a central bore wherein said shaft section in the region of said central bore has at least one radially penetrating threaded bore for receiving a holding screw.

27. A tool system that can be coupled to the drive shaft of a rotary tool, such as a hand drill or a screw drill comprising:
   a) a tool holding fixture coupled to the drive shaft of the rotary tool said tool holding fixture having a reception cylinder which contains a polygonal recess and wherein said reception cylinder contains a centering range;
   b) a combination tool disposed in said polygonal recess, of said reception cylinder said tool being fixed to said reception cylinder rotation fast, wherein said tool has a plurality of shafts extending coaxially within said polygonal recess, wherein said plurality of shafts each have at least one detent recess and at least one centering section which fit into, and contact said centering range on said tool holding fixture when in operation, and at least one functional section coupled to and extending coaxially with said shafts and wherein said plurality of shafts each have connection sections having undercuts;
   c) a plastic coupling ring having round bulges for engaging into said undercuts of said connection sections;
   d) a locking sleeve disposed around said tool holding fixture, and axially movable around said holding fixture; and
   f) at least one detent element, said at least one detent element disposed within said tool holding fixture, and for engaging said at least one detent recess of at least one of said plurality of shafts, wherein said locking sleeve can be moved along said tool holding fixture to alternately move said at least one detent element into a locking arrangement with said detent recess or an unlocking arrangement removed from said detent recess so that said tool can be either locked in or unlocked from said tool holding fixture.

28. The tool system according to claim 27, wherein said connection section is designed as non radially symmetric and co-act with a correspondingly shaped connection part in a shape locking manner so that said shaft sections of said part-tools are connected to each other rotationally-fast, wherein said polygonal profiles of said shaft sections have edges that are fixed in position with respect to one another in an aligned manner.

29. The tool system according to claim 28, wherein said undercuts have a cross-section in the shape of a circle segment, and wherein said connection parts have a corresponding circle-segment-shaped coupling recess.

30. A tool system that can be coupled to the drive shaft of a rotary tool, such as a hand drill or a screw drill comprising:

a) a tool holding fixture coupled to the drive shaft of the rotary tool, said tool holding fixture having a reception cylinder, which includes:
  i) a polygonal recess;
  ii) a centering range;
  iii) a torsion zone; and
  iv) a bending zone, wherein said torsion zone and said bending zone being disposed between radial recesses providing the reception of said at least one detent element and the centering range of said polygonal recess;
b) a combination tool comprising a plurality of tools being disposed in and fixed rotation fast to said polygonal recess of said reception cylinder, wherein each of said plurality of tools has a shaft and further includes:
  i) a centering section disposed within said shaft that fits into and contacts said centering range, wherein said centering section includes at least one detent recess disposed on said shaft;
  ii) at least one functional section comprising at least one sink section disposed on said shaft which can bevel drill holes for containing a threaded hole, and wherein at least one tool of said plurality of tools includes said functional section having a tap drill which is adapted to a cross section of the drill,
  a locking sleeve disposed around said tool holding fixture, and axially movable around said holding fixture; and
  at least one detent element disposed within said tool holding fixture, and for engaging said at least one detent recess of said tool shaft, wherein said locking sleeve can be moved along said tool holding fixture to alternately move said at least one detent element into a locking arrangement with said detent recess or an unlocking arrangement removed from said detent recess so that said tool can be either locked in or unlocked from said tool holding fixture.

31. A tool system that can be coupled to the drive shaft of a rotary tool, such as a hand drill or a screw drill comprising:
  a) a tool holding fixture coupled to the drive shaft of the rotary tool, said tool holding fixture having a reception cylinder, which contains a polygonal recess and wherein said reception cylinder contains a centering range;
  b) a tool disposed in said polygonal recess, of said reception cylinder, said tool being fixed to said reception cylinder rotation fast, wherein said tool has a shaft adapted to fit into said polygonal recess, wherein said shaft has at least one detent recess, at least one functional section, and at least one centering section which fits into and contacts said centering range on said tool holding fixture when in operation,
  c) a locking sleeve disposed around said tool holding fixture, and axially movable around said holding fixture;
  d) at least one detent element disposed within said tool holding fixture, and for engaging said at least one detent recess of said tool shaft, wherein said locking sleeve can be moved along said tool holding fixture to alternately move said at least one detent element into a locking arrangement with said detent recess or an unlocking arrangement removed from said detent recess so that said tool can be either locked in or unlocked from said tool holding fixture;
  e) a depth abutment which can be releasably mounted on said tool holding fixture, said depth abutment having a rearward section on said reception cylinder, and a forward section which is rotatably journalled at said rearward section; and
  f) a lock coupled to said depth abutment wherein said lock extends into, and is releasably connectable to a corresponding detent recess of said reception cylinder.

* * * * *